United States Patent
Bachmann et al.

(10) Patent No.: US 11,384,731 B2
(45) Date of Patent: Jul. 12, 2022

(54) METHOD AND SYSTEM FOR CONTROLLING A WIND TURBINE TO MANAGE EDGEWISE BLADE VIBRATIONS

(71) Applicant: VESTAS WIND SYSTEMS A/S, Aarhus N (DK)

(72) Inventors: Thomas Hedegaard Bachmann, Randers NV (DK); Anders Steen Nielsen, Højbjerg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 64 days.

(21) Appl. No.: 16/761,761

(22) PCT Filed: Nov. 5, 2018

(86) PCT No.: PCT/DK2018/050282
§ 371 (c)(1),
(2) Date: May 5, 2020

(87) PCT Pub. No.: WO2019/086092
PCT Pub. Date: May 9, 2019

(65) Prior Publication Data
US 2020/0263664 A1 Aug. 20, 2020

(30) Foreign Application Priority Data
Nov. 6, 2017 (DK) .............................. PA201770829

(51) Int. Cl.
*F03D 7/02* (2006.01)
*F03D 7/04* (2006.01)
*F03D 1/06* (2006.01)

(52) U.S. Cl.
CPC ......... *F03D 7/0296* (2013.01); *F03D 7/0276* (2013.01); *F03D 7/042* (2013.01);
(Continued)

(58) Field of Classification Search
None
See application file for complete search history.

(56) References Cited

U.S. PATENT DOCUMENTS

2014/0327243 A1* 11/2014 Demtroder .............. F03D 7/042
290/44
2020/0263666 A1* 8/2020 Pedersen ............... F03D 7/0224

FOREIGN PATENT DOCUMENTS

| CN | 101586527 A | 11/2009 |
| CN | 102410139 A | 4/2012 |

(Continued)

OTHER PUBLICATIONS

Danish Patent and Trademark Office 1st Technical Examination for Application No. PA 2017 70829 dated Feb. 24, 2018.
(Continued)

*Primary Examiner* — Juan G Flores
(74) *Attorney, Agent, or Firm* — Patterson + Sheridan, LLP

(57) ABSTRACT

A method of controlling a wind turbine for the avoidance of edgewise vibrations. The method includes the steps of determining a whirling mode frequency of a rotor blade of the wind turbine; determining an avoidance zone based on the whirling mode frequency, the avoidance zone being a rotor speed range; receiving a rotor speed setpoint; and either adjusting the rotor speed to a value outside the rotor speed range if the rotor speed setpoint is within the rotor speed range or adjusting the rotor speed to a value corresponding to the rotor speed setpoint if the rotor speed setpoint is outside the rotor speed range.

17 Claims, 9 Drawing Sheets

(52) U.S. Cl.
CPC ............... *F03D 1/06* (2013.01); *F03D 7/043* (2013.01); *F05B 2260/96* (2013.01); *F05B 2270/327* (2013.01); *F05B 2270/334* (2013.01)

(56) References Cited

FOREIGN PATENT DOCUMENTS

| CN | 103758698 A | 4/2014 |
|---|---|---|
| CN | 105041567 A | 11/2015 |
| EP | 2463517 A1 | 6/2012 |
| EP | 2623779 A2 | 8/2013 |
| EP | 2798200 A1 | 11/2014 |
| EP | 2851562 A1 | 3/2015 |
| WO | 2017036481 A1 | 3/2017 |
| WO | 2017092773 A1 | 6/2017 |
| WO | 2017174094 A1 | 10/2017 |
| WO | 2019086092 A1 | 5/2019 |

OTHER PUBLICATIONS

Petersen, Jørgen Thirstrup et al.,"Local Blade Whirl and Global Whirl Interaction", Risø-R-1067(EN). Risø National Laboratory, Roskilde, Denmark, Aug. 1998.

J. Licari et al., "Investigation of a speed exclusion zone to prevent tower resonance in variable-speed wind turbines", IEEE Transactions on sustainable energy, vol. 4, No. 4, Oct. 2013.

PCT International Search Report for Application No. PCT/DK2018/050282 dated May 2, 2019.

Chinese Office Action for Chinese Application 2018800838208 dated Jul. 19, 2021.

\* cited by examiner (a)

(b)

METHOD AND SYSTEM FOR CONTROLLING A WIND TURBINE TO MANAGE EDGEWISE BLADE VIBRATIONS

TECHNICAL FIELD

Aspects of the invention relate to a method and system for controlling a wind turbine and, more particularly, to identifying and mitigating unacceptable vibrations in the blades of the wind turbine.

BACKGROUND

Wind turbines are designed to operate reliably and safely under a wide range of wind conditions. However, despite careful design practices some operational conditions may result in oscillations of the wind turbine components, particularly the blades. Such oscillations can compromise the reliable operation of the wind turbine, and this is particularly the case if the frequency of the oscillations coincides with resonant frequencies of the wind turbine components.

One source of oscillation is the vibration of wind turbine blades in the edgewise direction. Edgewise vibrations at certain amplitudes can cause damage to the blades, but also to other components of the wind turbine.

It is known to strengthen and stiffen the blades with carbon fibres in order to modify the structural frequencies of the blades to avoid resonant edgewise vibrations at certain frequencies. However, this approach significantly adds to the overall cost of manufacturing the blades.

The present invention aims to address at least some of the abovementioned issues.

SUMMARY OF THE INVENTION

According to a first aspect of the invention, there is provided a method of controlling a wind turbine for the avoidance of edgewise vibrations, the method comprising the steps of determining a whirling mode frequency of a rotor blade of the wind turbine; determining an avoidance zone based on the whirling mode frequency, the avoidance zone being a rotor speed range; and, receiving a rotor speed setpoint, wherein the method further comprises the steps of either: adjusting the rotor speed to a value outside the rotor speed range if the rotor speed setpoint is within the rotor speed range; or, adjusting the rotor speed to a value corresponding to the rotor speed setpoint if the rotor speed setpoint is outside the rotor speed range. Because the rotor speed range corresponds to the avoidance zone, this means that the rotor speeds falling within the avoidance zone are avoided when the rotor speed setpoint is within the rotor speed range, thereby avoiding the excitation of unwanted blade edgewise vibrations.

Preferably, the steps of controlling and adjusting the rotor speed further comprise the steps of maintaining the rotor speed at a value equal to or below a rotor speed corresponding to a lower threshold of the rotor speed range when the received rotor speed setpoint is within the rotor speed range; and, increasing the rotor speed if the rotor speed setpoint equals or exceeds an upper threshold of the rotor speed range; or, maintaining the rotor speed at a value equal to or above a rotor speed corresponding to an upper threshold of the rotor speed range when the rotor speed setpoint is within the rotor speed range; and, decreasing the rotor speed if the rotor speed setpoint equals or falls below the lower threshold of the rotor speed range. The rotor speed is increased or decreased through the rotor speed range as quickly as is practically possible without subjecting mechanical and electrical systems to potentially damaging high dynamic loads.

Preferably, the determined whirling mode frequency is one or more of a forward whirling mode and a backward whirling mode. It is particularly advantageous to be able to determine the forward and backward whirling mode frequency independently, as well as simultaneously, as this provides flexibility of control and allows tailoring of the determination according to wind conditions.

Preferably, the whirling mode frequency is determined in dependence on a measured rotor frequency and a predetermined edgewise vibration frequency of the rotor blade.

Preferably the method further comprises the steps of measuring a signal indicative of the movement of the rotor blade of the wind turbine; determining a frequency spectrum of the measured signal in the proximity of the determined whirling mode frequency; obtaining a central frequency from the frequency spectrum; and, adjusting the determined whirling mode frequency with respect to the central frequency. This process identifies the frequency content in the movement of the rotor blade that can be considered attributable to the edgewise vibration of the blades and then calibrates the determined whirling mode frequency to assure its accuracy.

Preferably, the determined whirling mode frequency is adjusted to equal the central frequency.

Preferably, the signal is indicative of an edgewise vibration of the rotor blade.

Preferably, the signal is an acceleration signal indicative of the movement of the tower top of the wind turbine.

Preferably, a lower threshold and an upper threshold of the avoidance zone are each calculated as a percentage of the determined whirling mode frequency.

Preferably, the method further comprises the step of increasing or decreasing the width of the avoidance zone. Narrowing the width of the avoidance zone improves the power performance of the wind turbine. However, if excessive vibrations are experienced at the thresholds of the avoidance zone, giving rise to potentially damaging high dynamic loads, increasing the width of the avoidance zone will avoid these vibrations.

Preferably, a centre value of the avoidance zone is the determined whirling mode frequency.

Preferably, the step of increasing the rotor speed if the rotor speed setpoint equals or exceeds the upper threshold of the rotor speed range occurs when the rotor speed setpoint equals or exceeds the upper threshold of the rotor speed range for a predetermined period, and the step of decreasing the rotor speed if the rotor speed setpoint equals or falls below the lower threshold of the rotor speed range occurs when the rotor speed setpoint equals or falls below the lower threshold of the rotor speed range for a predetermined period. A benefit of this is to reduce the likelihood of implementing a control action on the basis of transient or anomalous wind conditions Preferably, the rotor speed within the rotor speed range is a non-linear function of wind speed.

Preferably, the rotor speed is increased or decreased non-linearly with respect to wind speed.

According to a second aspect of the invention, there is provided controller for a wind turbine control system comprising a processor and a memory module, wherein the memory module comprises a set of program code instructions which when executed by the processor implement a method according to the first aspect of the invention.
}

According to a third aspect of the invention, there is provided a wind turbine comprising the controller according to the second aspect of the invention.

According to a fourth aspect of the invention, there is provided a computer program product downloadable from a communication network and/or stored on a machine readable medium comprising program code instructions for implementing a method according to the first aspect of the invention.

BRIEF DESCRIPTION OF THE DRAWINGS

The above and other aspects of the invention will now be described, by way of example only, with reference to the accompanying drawings, in which.

In the drawings, like features are denoted by like reference numerals.

DESCRIPTION

Figure 1:
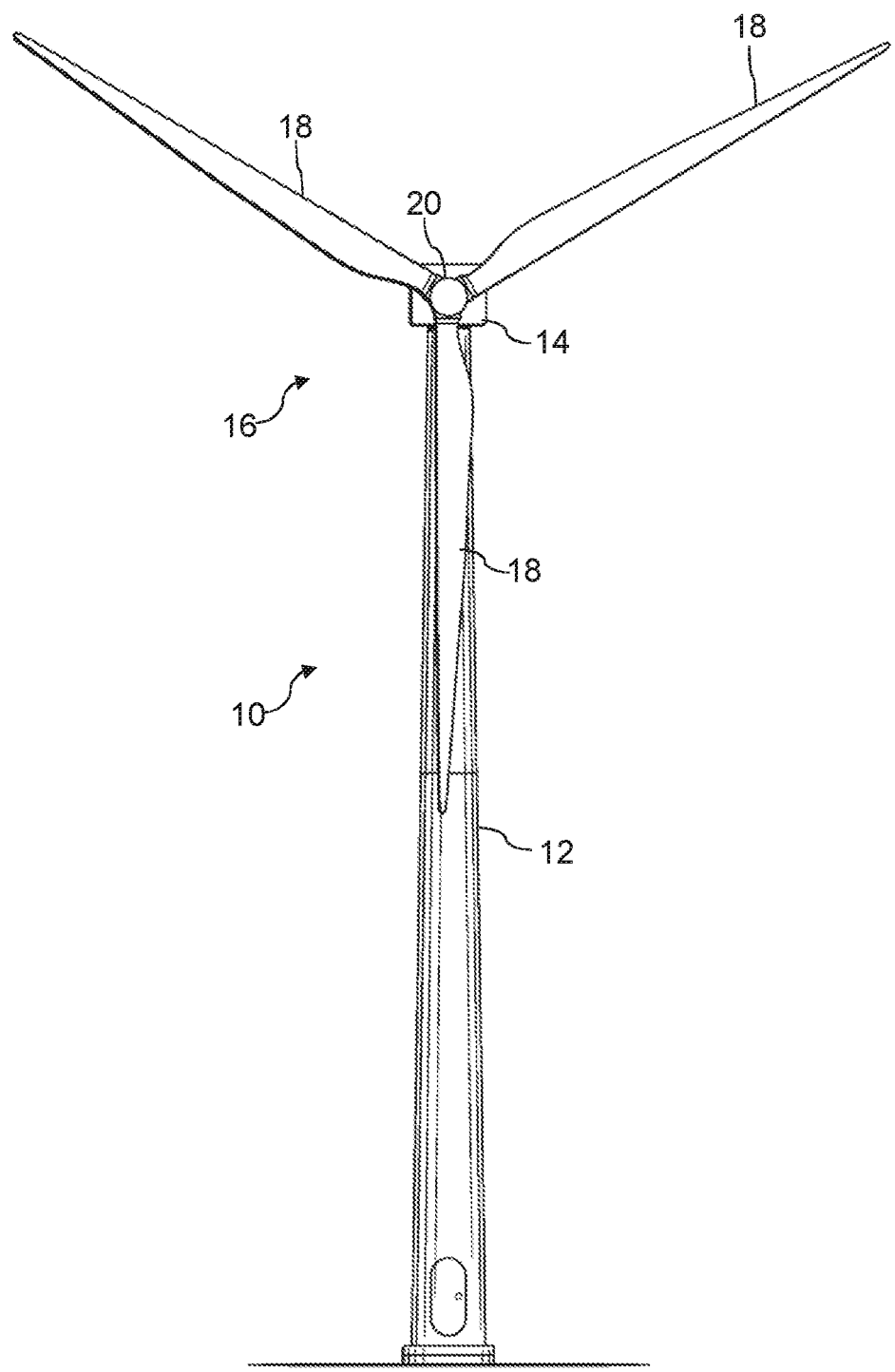
FIG. 1 is a schematic view of a wind turbine according to an embodiment of the present invention.

FIG. 1 shows a wind turbine 10 comprising a tower 12 supporting a nacelle 14 to which a rotor 16 is mounted. The rotor 16 comprises a plurality of wind turbine blades 18, wherein each blade 18 of the plurality of wind turbine blades 18 extends radially from a central hub 20. In this example, the rotor 16 comprises three blades 18, although it will be apparent to those skilled in the art that other configurations are possible.

Figure 2:
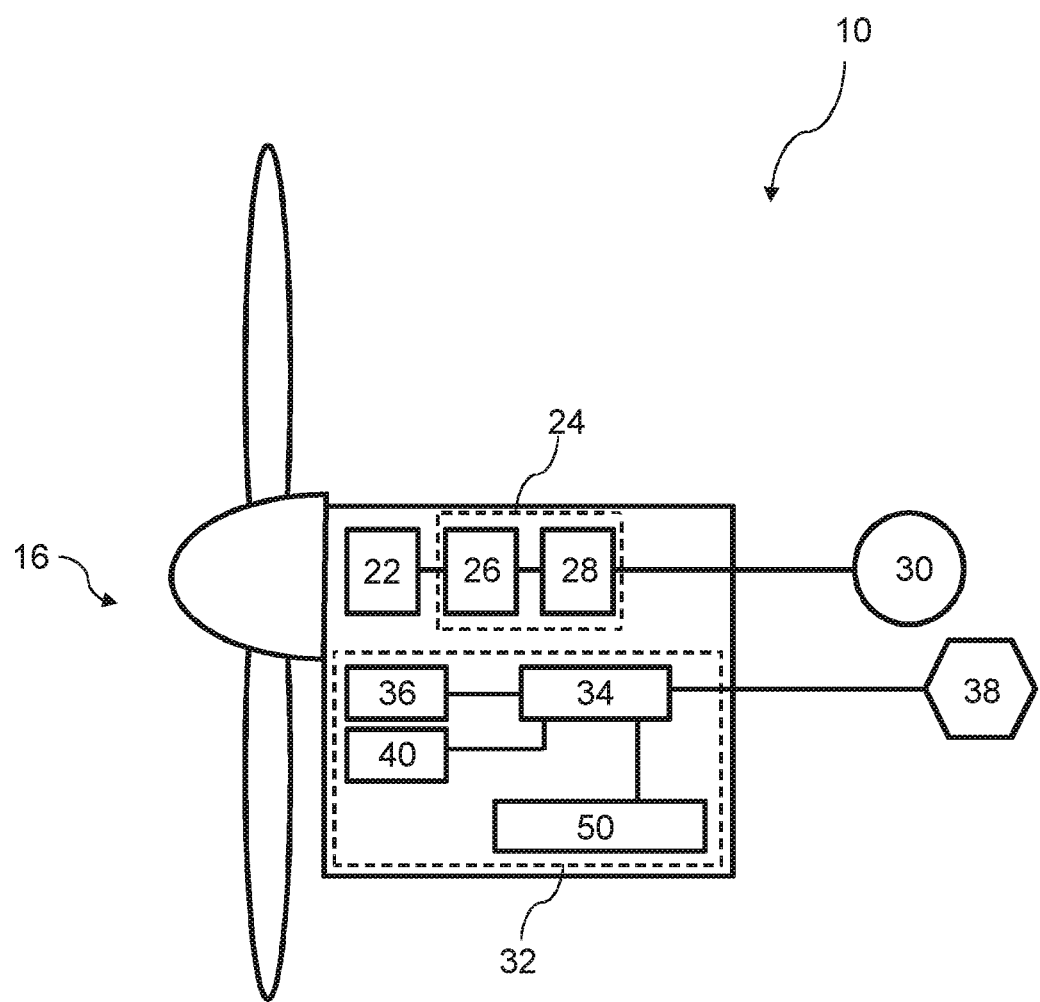
FIG. 2 is a schematic systems view of the wind turbine in FIG. 1.

With reference also to FIG. 2, which is a schematic illustration of the wind turbine 10 at a systems level, the wind turbine 10 further comprises a gearbox 22 and a power generation system 24 including a generator 26 and a power converter system 28. As is known, the gearbox 22 gears up the rotational speed of the rotor 16 and drives the generator 26, which in turn feeds generated power to a converter system 28. Usually such a system will be based on three-phase electrical power, although this is not essential. Other wind turbine designs are known, such as 'gearless' types, also known as 'direct drive', as well as 'belt drive' transmission types.

The generator 26 and converter system 28 may, as examples, be based on a full-scale converter (FSC) architecture or a doubly-fed induction generator (DFIG) architecture, although other architectures would be known to the skilled person.

In the illustrated embodiment, the power output of the converter system 28 of the wind turbine 10 is transmitted to a load, which is shown here as an electrical grid 30. The skilled person would be aware that different power conversion and transmission options exist.

The wind turbine 10 further comprises a control means 32 that is operable to monitor the operation of the wind turbine 10 and to issue commands thereto to achieve a set of control objectives. The control means 32 is shown in FIG. 2 as a simplified, schematic overview of a plurality of control units and modules, and also in FIG. 3, as a more detailed example of how specific units and modules may be arranged in order to facilitate data exchange between them.

The control means 32 comprises a processor 34 configured to execute instructions that are stored in and read from a memory module 36 and/or an external data store that forms part of an external network 38. Measurement data may also be stored in the memory module 36, and recalled in order to execute processes according to the instructions being carried out by the processor 34.

Instructions and data may also be received from external controllers or sensors that form part of the external network 38, and recorded data and/or alerts may be issued over the external network 38 to be stored/displayed at an external source for analysis and remote monitoring.

In addition, the processor 34 is in communication with a plurality of sensors 40 that are disposed within the wind turbine 10. For example, as shown in FIG. 3, the plurality of sensors 40 may comprise a tower accelerometer 42, a rotor speed sensor 44, a blade pitch angle sensor 46, a nacelle yaw angle sensor 48, and a wind speed sensor 49.

The control means 32 of the wind turbine 10 also includes at least one control unit 50.

Figure 3:
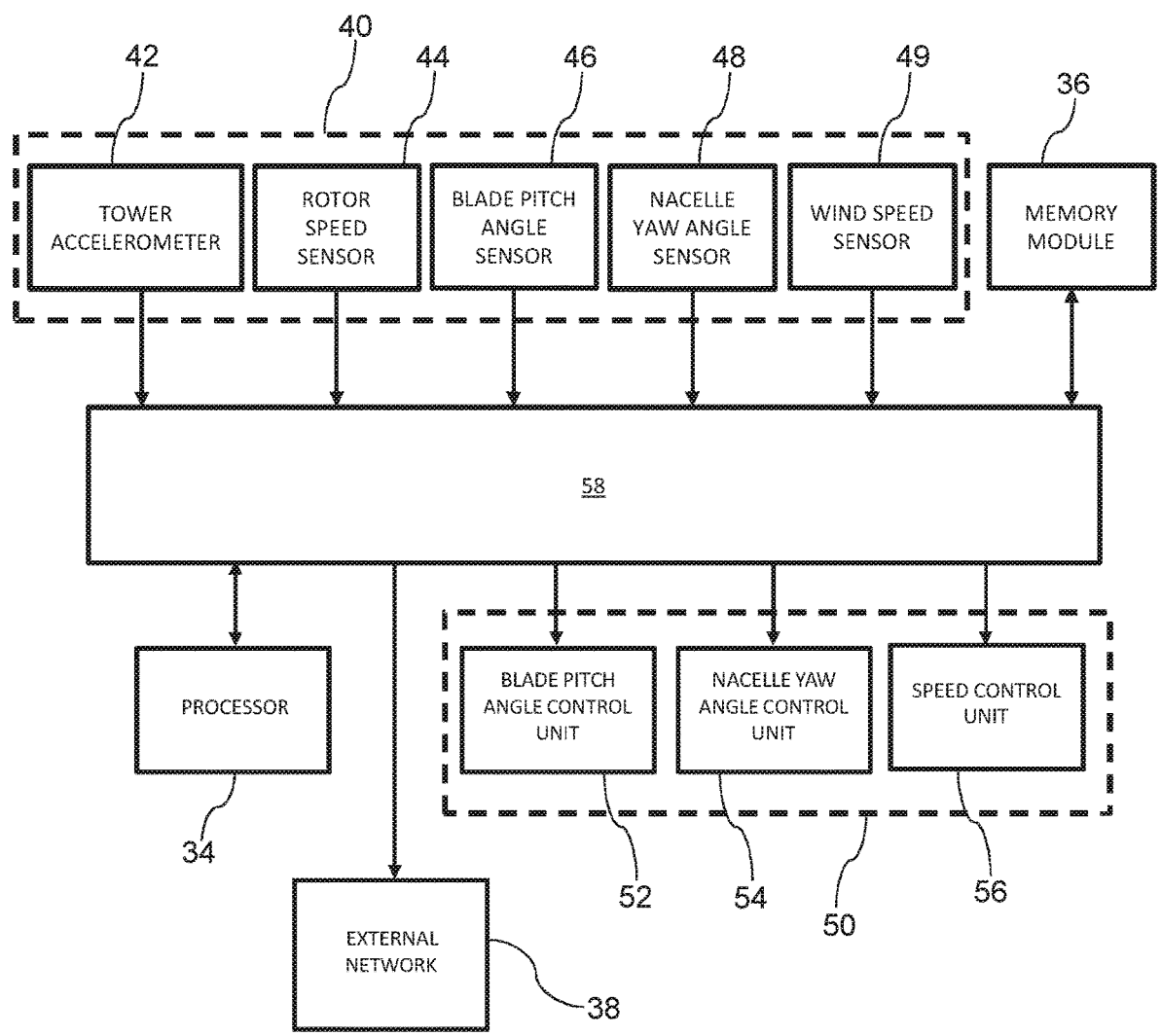
FIG. 3 is a detailed schematic systems view of a monitoring and control system of the wind turbine system of FIG. 2.

In the configuration shown in FIG. 3, three control units 50 are included. These are (i) a blade pitch angle control unit 52 for altering the blade pitch angle of the rotor blades 18; (ii) a nacelle yaw angle control unit 54 for altering the yaw angle of the nacelle 14; and, (iii) a speed control unit 56 that is used to alter the rotor speed of the wind turbine 10 using a brake, for example. In an alternative embodiment, the control means 32 includes a production controller (not shown), which controls the rotor speed of the wind turbine 10 through converter control and pitch control, depending on the specific control setup, thereby removing the need for a dedicated speed control unit 56.

It should be appreciated that the wind turbine 10 would include more control units 50, and that FIG. 3 is provided only to illustrate an example of a system architecture in which the invention may be implemented.

A principal function of the control means 32 is to control power generation of the wind turbine 10 so that it optimises power production under current wind conditions and in accordance with demanded power generation by a transmission grid operator. However, in addition to its main power control tasks, the control means 32 may be operable to perform a suite of safety and diagnostic monitoring functions and solutions. In the embodiments of the invention, one of these functions is to assess the conditions giving rise to unacceptable blade edgewise vibrations, and to control the wind turbine 10 accordingly. The identification of blade edgewise vibrations is important, as it may aid in preventing damage to the wind turbine 10 due to unwanted oscillation of the rotor 16 during operation. Additionally, monitoring should be undertaken to ensure that dangerous levels of vibration are not reached.

Figure 4:
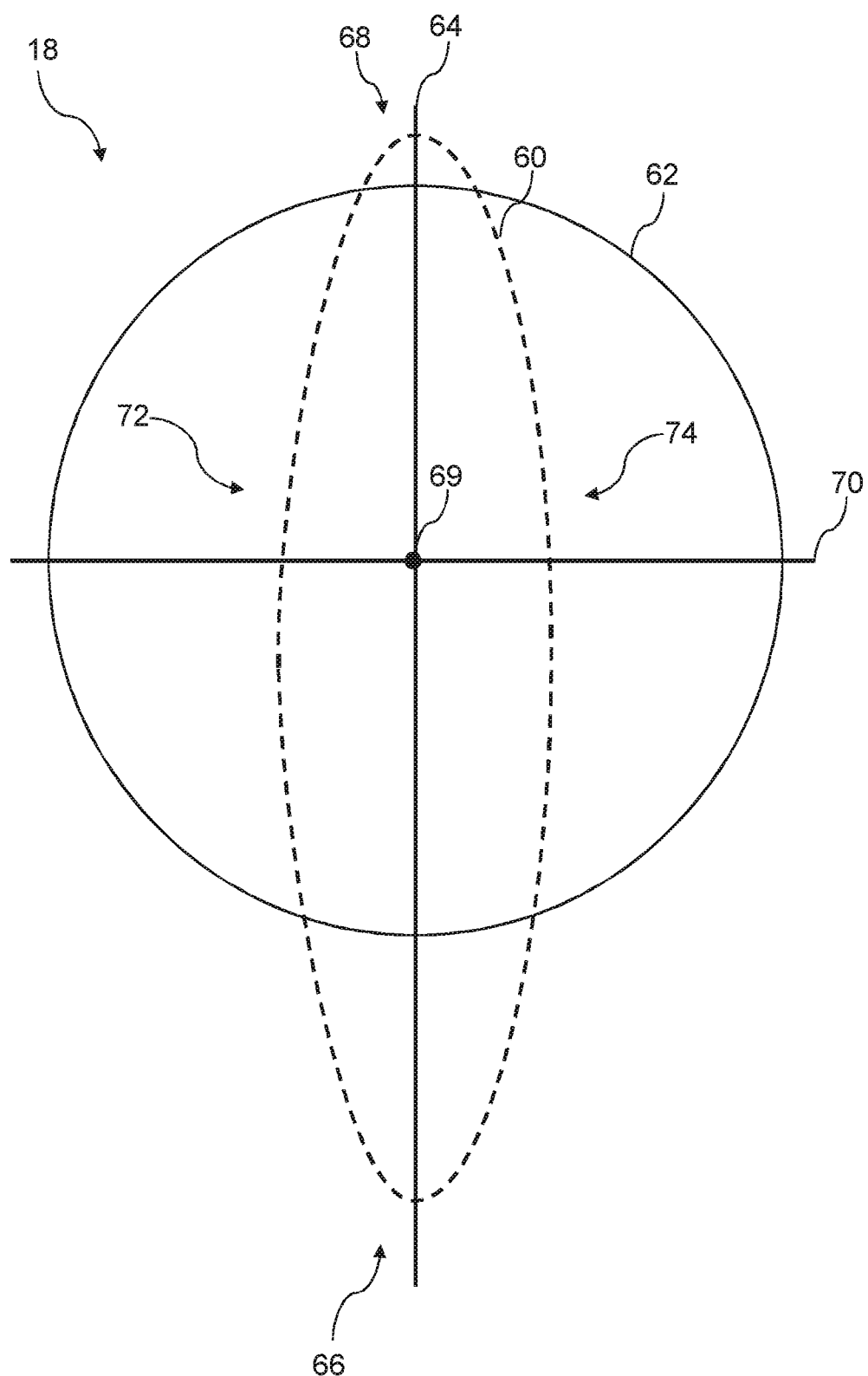
FIG. 4 is a diagram illustrating a schematic cross section of a wind turbine rotor blade.
Figure 5:
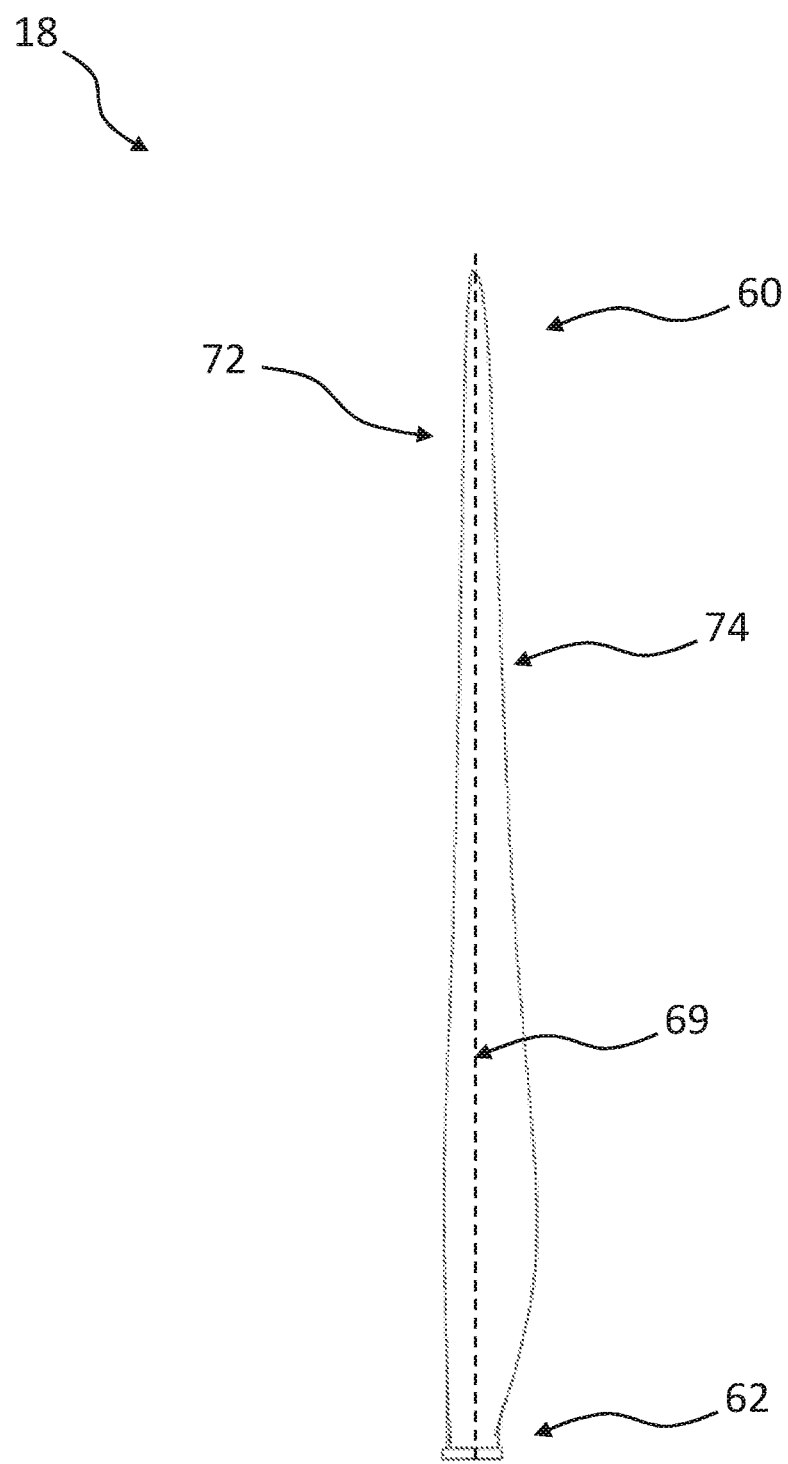
FIG. 5 is a side view of the wind turbine rotor blade of FIG. 4.

Edgewise vibrations of rotor blades occur along the length of the blade in the edgewise direction, which is one of two main directions in which the blade principally vibrates and oscillates. The other main direction of oscillation is in a "flapwise" direction. Referring to FIGS. 4 and 5, when considering a rotor blade 18 having an outboard blade section 60, indicated by dotted lines in FIG. 4, and a circular blade root 62, having a circumference, oscillations in the edgewise direction cause the blade 18 to move along an edgewise axis 64 which extends generally through the leading and trailing edges 66, 68 of the blade 18. The edgewise axis 64 is therefore substantially perpendicular to the longitudinal axis 69 of the blade 18. Similarly, oscillations in the flapwise direction cause the blade to move relative to a flapwise axis 70 which extends through the upper and lower surfaces 72, 74 of the blade 18 and is substantially perpendicular to both the longitudinal axis 69 and the edgewise axis 64 of the blade 18. A blade may oscillate in both flapwise and edgewise directions.

When the rotor 16 is turning, oscillations of the blades 18 along their edgewise axes can cause movement of the blade 18 in the same plane as the plane of rotation of the rotor 16. Since edgewise oscillation of the blades 18 excites the rotor 16 with a force that is transverse to its longitudinal axis, in resonant conditions this may result in the rotational axis of the rotor shaft describing an erratic pattern of motion. This phenomenon is known as 'whirling'.

The seemingly complex pattern of motion of the rotor 16 is the result of two circularly rotating force vectors that are generated by the combined oscillatory behaviour of the blades. A first force vector rotates in the same rotational direction as the rotor 16 but at a higher frequency (progressive force vector) and a second force vector that rotates in a direction opposite to that of the rotor and at a lower frequency (regressive force vector). The result of the progressive and regressive force vectors is a force vector that traces an elliptical path, when viewed in a rotating reference frame aligned with the rotor 16.

The phase difference between the edgewise oscillations of the blades determines whether whirling occurs in the same direction as the rotor rotation, which is generally known as forward whirl or 'forward whirling mode', or whether whirling occurs in a direction opposite to that of the rotor rotation, which is generally known as backwards whirl or 'backwards whirling mode'.

As will be appreciated, whirling of the rotor shaft imparts lateral forces to the nacelle 14 via the rotor 16 and therefore causes it to sway from side to side. This motion may be detectable by monitoring the behaviour of the nacelle 14 or the upper portion of the tower 12, and motion at a whirling frequency above a certain level can be considered to be indicative of the blades 18 oscillating unacceptably in the edgewise direction. It is this movement that the inventor has appreciated can be used to identify blade edgewise vibrations and to take mitigating action.

Figure 6:
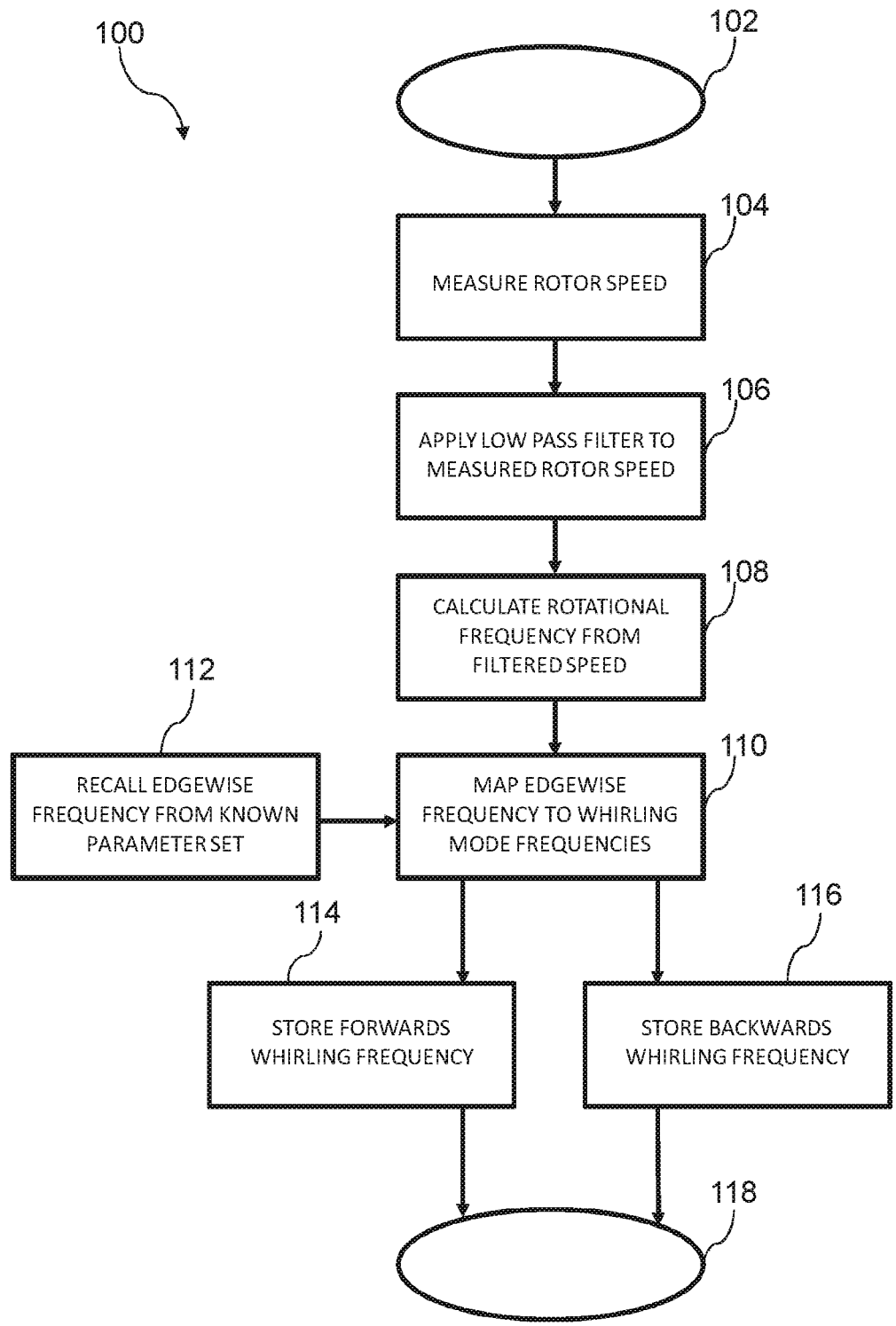
FIG. 6 is a flow chart that illustrates a process by which the forward and backward whirling mode frequencies of the wind turbine of FIG. 1 may be calculated.
Figure 7:
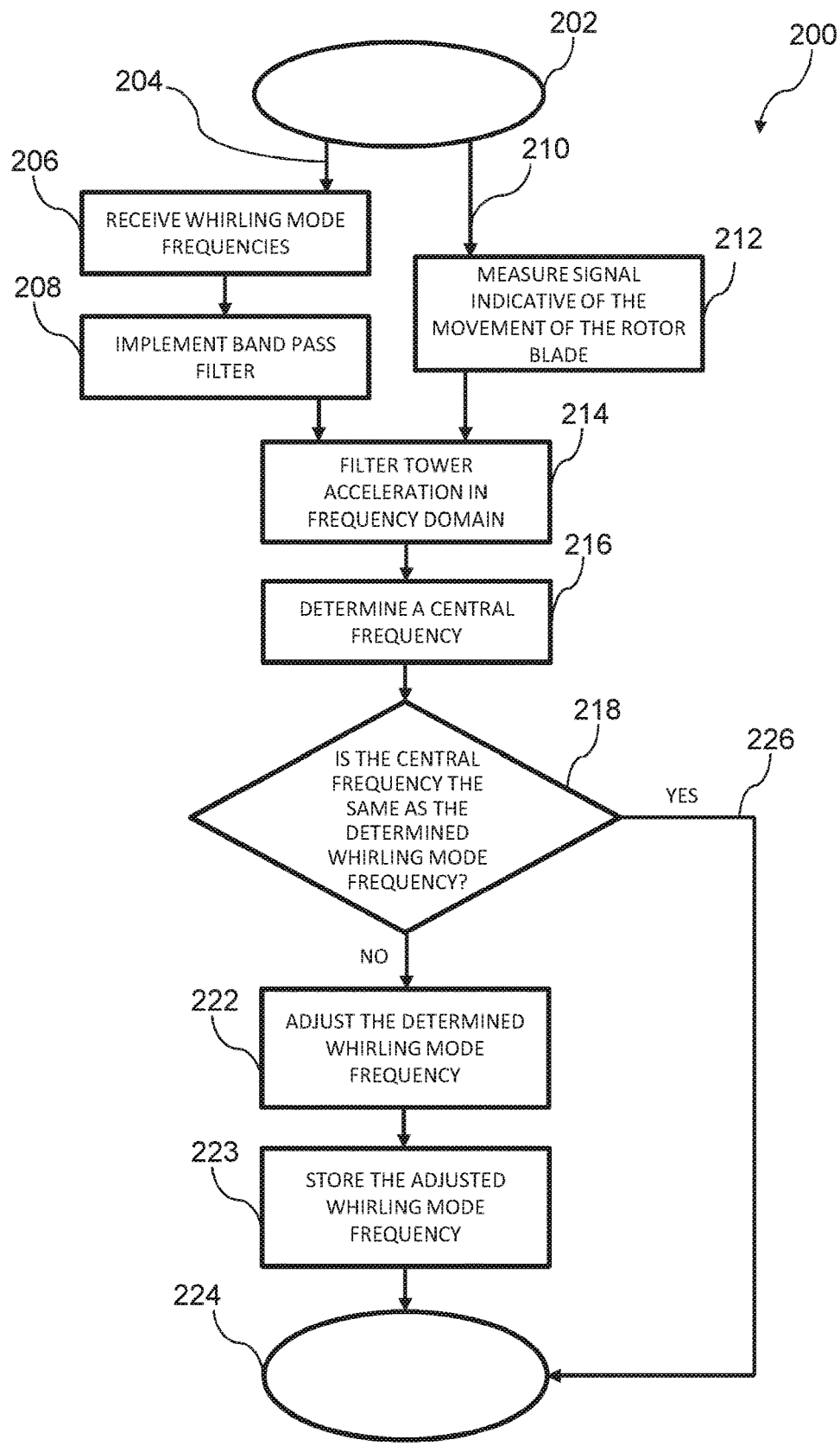
FIG. 7 is a flow chart that illustrates an additional process by which the forward and backward whirling mode frequencies of the wind turbine of FIG. 1 may be calculated.
Figure 8:
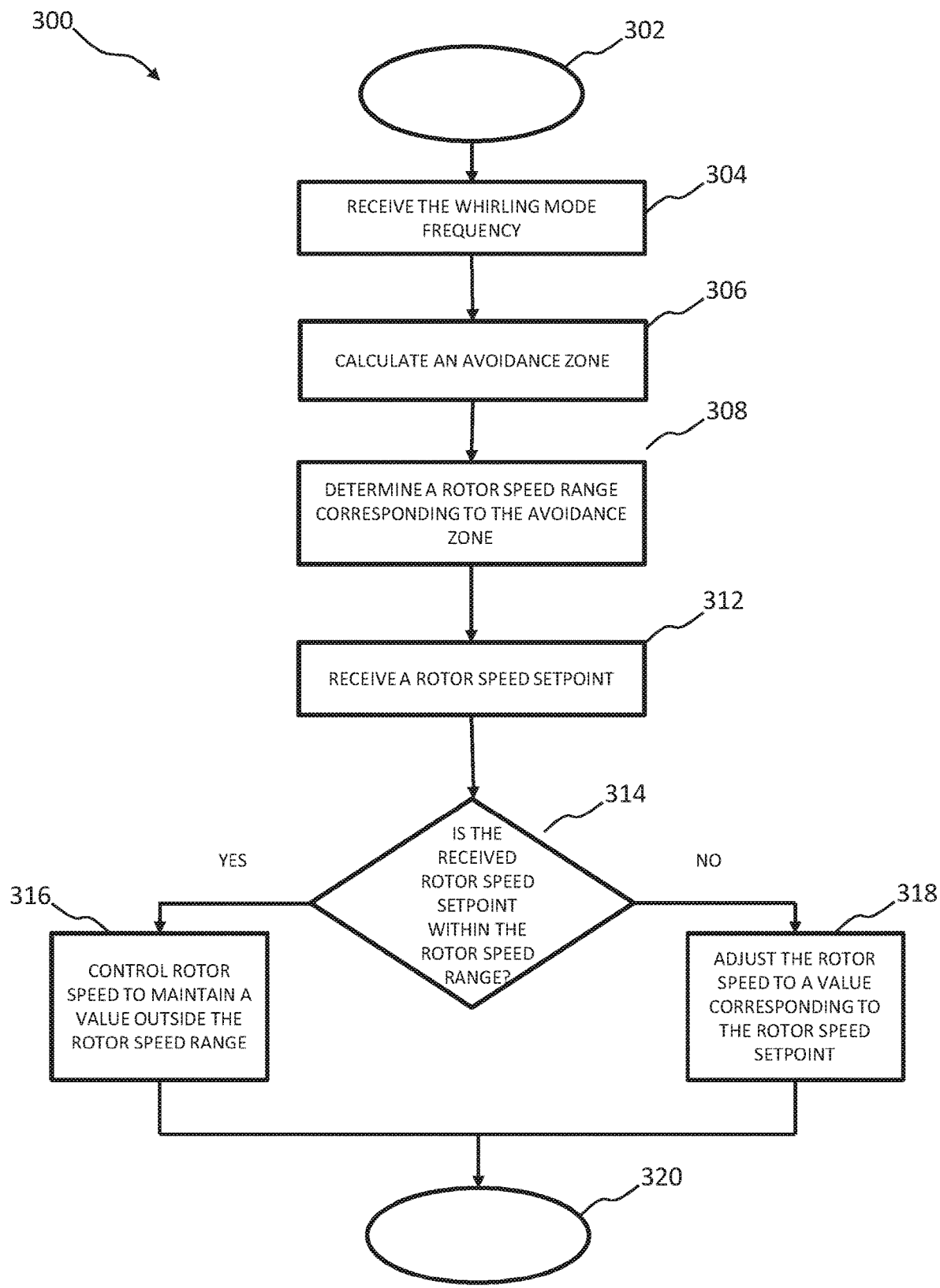
FIG. 8 is a flow chart that illustrates a process for controlling the wind turbine of FIG. 1; and, FIG. 9 shows graphs illustrating the difference in the process for controlling the wind turbine of FIG. 1.

FIGS. 6 to 8 are flow diagrams of processes according to embodiments of the invention. FIGS. 6 and 7 both show flowcharts of processes 100, 200 by which the frequency of the forward and backward whirling modes may be calculated. FIG. 8 is a flowchart of a process 300 for controlling a wind turbine 10, based on identification of the whirling mode frequencies. These processes may be implemented using the system architectures outlined in FIGS. 2 and 3.

The process 100 of FIG. 6 initiates at step 102, and at the second step 104, the rotor speed is measured by the rotor speed sensor 44. A time series of the rotor speed measured over a predetermined measurement period by the sensor 44 is created and at the next step of the process 106, a low pass filter is applied to the rotor speed time series measurement. By applying a low pass filter, an average rotor speed signal is obtained.

From the average rotor speed, a rotational frequency is calculated 108. The process moves to the next step 110, where, by using a predetermined edgewise frequency value 112 and the rotational frequency 108, the whirling mode frequencies can be mapped 110. The edgewise frequency 112 is the frequency at which the rotor blades 18 vibrate in the edgewise direction, and is a known parameter of the rotor blades 18 that is stored and recalled from the memory module 36. The edgewise frequency value 112 may be calculated using a number of techniques, for example it may be calculated based on structural models of the specific blade type used on the wind turbine or it may be determined by way of subjecting that specific blade type to a testing procedure designed to identify the natural edgewise frequency (eigenfrequency) of the blade.

In one embodiment, the mapping 110 of the edgewise frequency to forward and backward whirling mode frequencies is envisaged to be a subtraction and addition of the two component frequencies, i.e. the backward whirling mode frequency is calculated by subtracting the rotational frequency 108 from the edgewise frequency 112, and the forward whirling mode frequency is calculated by the addition of the rotational frequency 108 and the edgewise frequency 112. The mapping of higher order modes is also envisaged.

Following the mapping step 110, whirling mode frequencies, which correspond to a forward whirling mode and a backward whirling mode, are obtained. These whirling mode frequencies are then stored 114, 116 in the memory module 36 for subsequent use, before the process terminates at step 118. It is envisaged that the process repeats continually so as to re-calculate the whirling mode frequencies to ensure they are accurate. It will be appreciated by those skilled in the art that the various whirling mode frequencies of the wind turbine 10 could also be determined during the design of the blade 18 and/or modelling of the rotor 16.

Once the whirling mode frequencies have been calculated, a further process 200, as illustrated in FIG. 7, may be used to calibrate the determined whirling mode frequencies, as will now be described.

The process 200 initiates at step 202, which may be when the wind turbine 10 has been started but prior to reaching a power generating state or during a production state.

Initially, the process 200 proceeds along two branches simultaneously. At a first branch 204, a whirling mode frequency is received 206. The whirling mode frequency is calculated according to the process 100 shown in FIG. 6, and recalled from the memory module 36 by the processor 34. In another embodiment of the invention, the whirling mode frequency may be a parameter stored within the memory module 36 that has been calculated or predetermined in some other way, for example determined during the design of the blade and modelling of the rotor system.

It will be appreciated that both of the whirling mode frequencies calculated using the process 100 or otherwise determined may be used in the process 200 by implementing two of the processes 200 simultaneously. However, for ease of understanding the following discussion will be based on analysing data relating to a single whirling mode frequency.

Having received the whirling mode frequency, the processor 34 implements, at step 208, a band-pass filter having a centre frequency set as equal to the whirling mode frequency. A bandwidth for the filter may be a set bandwidth for each whirling mode frequency, or it may vary according to the frequency and/or speed of the rotor. It is envisaged, however, that the bandwidth of the filter would be in the range 0.1 Hz to 0.5 Hz, although it is possible that smaller or greater bandwidths could be used depending on the intended outcome.

In a second initial branch 210 of the process 200, at step 212, a signal indicative of the edgewise vibrational movement of the blades 18 is measured. The signal may include a component of tower acceleration in a direction parallel to the rotor plane, i.e. transverse to a longitudinal axis of the nacelle. The tower acceleration is measured using a sensor, such as the accelerometer 42, either mounted within the nacelle 14 or located towards the top of the tower 12. The processor 34 receives an acceleration measurement time series over a respective period of time. The period over which measurements are made may vary according to the speed of the rotor 16 or may be set at a single value. Measurements are made continuously by the accelerometer using a series of overlapping sampling windows, also referred to as a 'rolling average' or other methods. A typical window length would be between 1 and 5 seconds, with a sampling frequency of at least 10 Hz. It will be appreciated by those skilled in the art that other averaging techniques may be used such as an exponential averaging technique.

Alternatively, the signal measured at step 212 could be obtained from a sensor (not shown) suitable for measuring the edgewise vibrational movement of the blades 18, such as an optical sensor, an accelerometer or a gyrosensor, placed in the root of each of the blades 18 or at other positions in the blades 18.

The signal measured at step 212 is then filtered, at step 214, using the band-pass filter. Some operational vibration and other frequency content is filtered out by the band-pass filter, leaving a signal that is substantially composed of vibration in the region of the whirling mode frequency that is caused by the edgewise vibrations of the blades 18. In this way, the process determines, obtains, or calculates a frequency spectrum in the time domain of the measured edgewise vibrational movement of the blades 18 in the proximity of the determined whirling mode frequency. In effect, this process narrows the scope of the measured acceleration or other signals indicating the edgewise vibrational movement of the blades 18 to consider only the region of the whirling mode frequency.

At step 216, a central frequency is determined from the frequency spectrum obtained in step 214 as the frequency component with the largest peak in the frequency spectrum or with the highest power spectral density.

The central frequency signal is then compared, at step 218, to the whirling mode frequency obtained from process 100 or otherwise determined.

If the central frequency is the same as the determined whirling mode frequency, the process 200 progresses to step 224, where the process 200 terminates. However, if the central frequency differs from the determined whirling mode frequency, the process 200 progresses to step 222 where the determined whirling mode frequency is adjusted, for example, so as to be the same as the central frequency. The process 200 then progresses to step 223 where the adjusted whirling mode frequency is stored in the memory module 36 for subsequent use, before the process 200 terminates at step 224. It is envisaged that the process 200 could repeat continually to adjust the determined whirling mode frequency to ensure that it is accurate.

Once the whirling mode frequency has been determined using process 100 and/or process 200, a further process 300, as illustrated in FIG. 8, is used to decide how the wind turbine 10 should be controlled in view of the determined whirling mode frequency.

The process 300 initiates at step 302, which can be any time during which the wind turbine 10 is operating, and in the second step 304, the whirling mode frequency is received having been recalled from the memory module 36 by the processor 34. An avoidance zone is then calculated at the next step 306 of the process 300 based on the whirling mode frequency received at step 304. The avoidance zone is essentially a buffer extending either side of the determined whirling mode frequency and defines a rotor speed range that could give rise to unwanted edgewise vibrations of the blades 18. The avoidance zone can be calculated as a percentage of the determined whirling mode frequency, defining a lower threshold and an upper threshold of the avoidance zone. For example, if the determined whirling mode frequency is 2 Hz, a lower threshold of the avoidance zone, calculated as 10% of the determined whirling mode frequency, would be 1.8 Hz, whereas an upper threshold would be 2.2 Hz. In this example, the width of the avoidance zone is 0.4 Hz. However, if no significant vibrations are measured at the thresholds of the avoidance zone, the width of the avoidance zone can be subsequently decreased. Conversely, the width of the avoidance zone may be increased if excessive vibrations are experienced at the thresholds of the avoidance zone. The width of the avoidance zone may also been adjusted according to the operational load of the wind turbine. In the above example, the determined whirling mode frequency is the centre value of the avoidance zone. However, it will be appreciated by those skilled in the art that are advantages to having one threshold of the avoidance zone offset further from the determined whirling mode frequency than the other threshold. In this way, the avoidance zone would be distributed asymmetrically about the determined whirling mode frequency.

At step 308, a rotor speed range corresponding to the avoidance zone is determined.

At the fifth step 312, a rotor speed setpoint is determined as a function of wind speed, which either can be estimated or directly measured by the wind speed sensor 49. If the wind speed is measured, a time series of the wind speed measured over a predetermined measurement period by the sensor 49 is created. The period over which measurements are made may vary according to, for example, the astronomical season or may be set at a single period. Measurements may be made continuously by the sensor 49 using a series of overlapping sampling windows, resulting in a "rolling average". However, it will be appreciated by those skilled in the art that other averaging techniques may be used, such as an exponential averaging technique.

The received rotor speed setpoint is then compared, at step 314, to the rotor speed range obtained at step 308. The rotor speed setpoint is considered to be within the rotor speed range if it is below an upper threshold of the rotor speed range or above a lower threshold of the rotor speed range. Conversely, the rotor speed setpoint is considered to be outside the rotor speed range if it is equal to or exceeds the upper threshold of the rotor speed range or if it is equal to or below the lower threshold of the rotor speed range.

If the rotor speed setpoint is within the rotor speed range, the process 300 progresses to step 316 where the rotor speed is controlled such that it is held outside of the rotor speed range determined in step 308 of the process 300. That is, the rotor speed is intentionally kept to a value equal to or exceeding the upper threshold of the rotor speed range or to a value equal to or below the lower threshold of the rotor speed range. Because the rotor speed range corresponds to the avoidance zone, this means that the rotor speeds falling within the avoidance zone are avoided when the rotor speed setpoint is within the rotor speed range, thereby avoiding the excitation of blade edgewise vibrations. The decision as to whether to hold the rotor speed at a value equal to or exceeding the upper threshold of the rotor speed range or to a value equal to or below the lower threshold of the rotor speed range is based on the development of the received rotor speed setpoint. That is, if the rotor speed setpoint starts low and increases beyond the lower threshold of the rotor speed range, then the rotor speed will be maintained at a value equal to or below the lower threshold of the rotor speed range so long as the rotor speed setpoint remains in the rotor speed range. Conversely, if the rotor speed setpoint starts high and decreases beyond the upper threshold of the rotor speed range, then the rotor speed will be kept at a value equal to or above the upper threshold of the rotor speed range.

If, at step 314, it is determined that the rotor speed setpoint falls outside the rotor speed range, the process 300 progresses to step 318 where the rotor speed is adjusted to a value corresponding to the rotor speed setpoint. That is, the rotor speed is either increased or decreased to a value corresponding to the received rotor speed setpoint. This step 318 covers two general situations. The first situation is where the rotor speed setpoint has successively moved from a value within the rotor speed range, and so the avoidance zone, to a value outside the avoidance zone. In this situation, the rotor speed is maintained at a value equal to or exceeding the upper threshold of the rotor speed range or at a value equal to or below the lower threshold of the rotor speed range in accordance with step 316, and then subsequently decreased or increased to a value corresponding to the rotor speed setpoint in accordance with step 318. The second situation is where the rotor speed setpoint has successively moved across the rotor speed range, and so the avoidance zone, from a value equal to or below the lower threshold of the rotor speed range to a value equal to or above the upper threshold of the rotor speed range. In this situation, the rotor speed is maintained at a value equal to or below the lower threshold of the rotor speed range, and then subsequently increased through the avoidance zone to a value equal to or above the upper threshold of the rotor speed range. The second situation also covers circumstances in which the rotor speed setpoint has successively moved across the avoidance zone, from a value equal to or above the upper threshold of the rotor speed range to a value equal to or below the lower threshold of the rotor speed range.

The process 300 terminates at step 320 following the execution of steps 316, 318. However, it is envisaged that the process 300 could repeat continually to control the rotor speed with respect to the avoidance zone. In that case, the process 300 could be continued from the initial step 302 or from step 314.

In both of the situations described above regarding step 318, the rotor speed can be increased or decreased through the rotor speed range as quickly as is practically possible without subjecting the rotor 16 and other mechanical and electrical systems to potentially damaging high dynamic loads.

Figure 9:
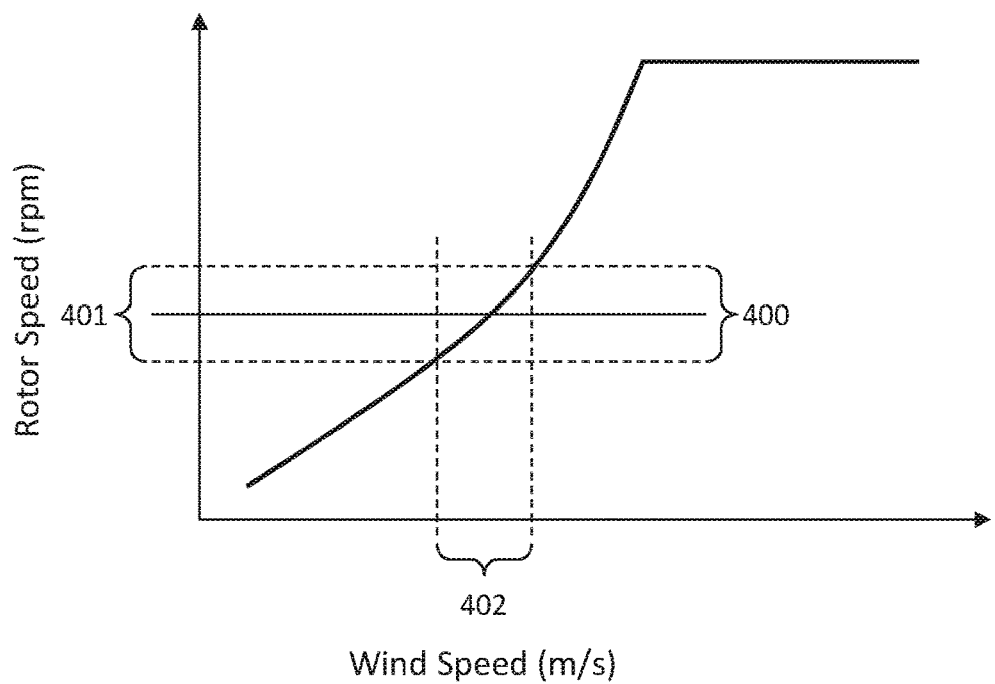
Figure 9:
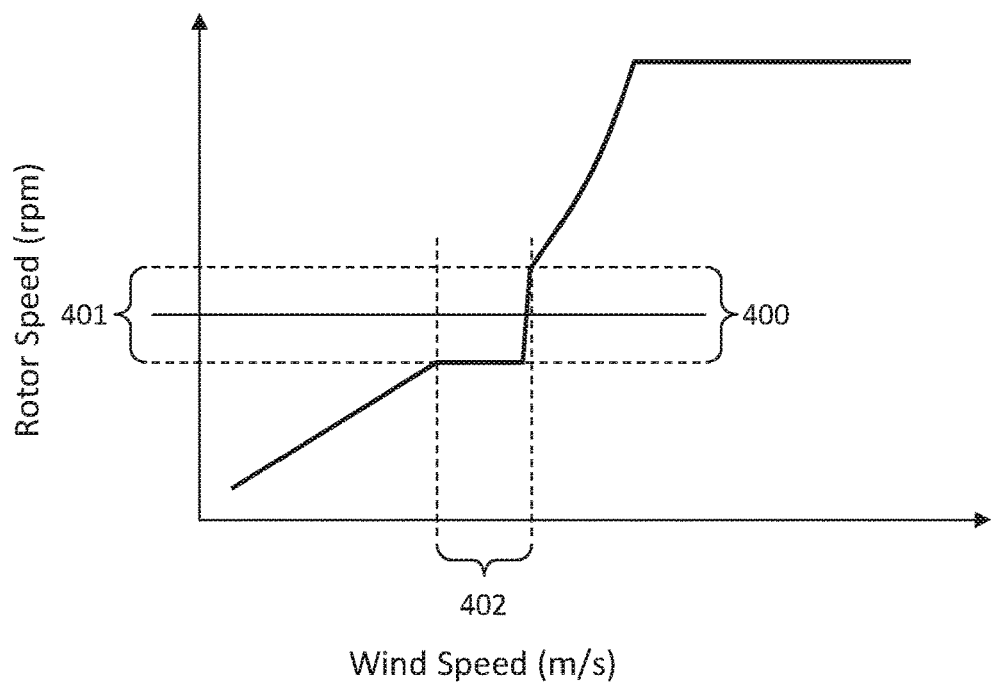

FIG. 9 shows curves for the rotor speed as a function of wind speed for the situation where the avoidance zone is in the partial load region. In partial load operation, the energy in the wind is not sufficiently high in order for the turbine to operate at rate output, instead it is controlled to capture as much energy from the wind as it can, in view of possible constraints, such as an avoidance zone of the rotor speed.

FIG. 9 shows the known progression of the rotor speed through the avoidance zone 400, graph (a), and the comparative progression of the rotor speed through the avoidance zone 400 according to the present invention, graph (b).

Graph (a) illustrates the correlation between the avoidance zone 400, the rotor speed range 401 and a wind speed range 402, and shows the rotor speed as a linear function of the wind speed. It can be seen that the progression of the rotor speed through the rotor speed range 401, and so the avoidance zone 400, follows this linear function. Therefore, the rotor speed will be within the avoidance zone 400 whenever the rotor speed falls within the rotor speed range 401, potentially giving rise to unwanted edgewise vibrations of the blades 18. Of course, the likelihood that the blades 18 experience edgewise vibrations increases the longer the rotor speed remains in the rotor speed range 401.

Graph (b) illustrates the situation where the rotor speed has started from a value equal to or below the lower threshold of the rotor speed range 401 and has increased to a value equal to or above the upper threshold of the rotor speed range 401. In this situation, the rotor speed is held at a value equal to or below the lower threshold of the rotor speed range 401 so as to avoid the avoidance zone 400, and then rapidly increased through the rotor speed range 401 to a value equal to or above the upper threshold of the rotor speed range 401. It can be seen that the rotor speed is a linear function of the wind speed either side of the avoidance zone 400. However, the rapid passage through the rotor speed range 401 can be characterised by the rotor speed being a non-linear function of the wind speed. That is, the rotor speed is increased or decreased thorough the rotor speed range 401 non-linearly with respect to the wind speed so as to minimise the duration over which the rotor speed is within the avoidance zone 400, and so the emergence of edgewise vibrations of the blades 18.

In the opposite situation, to the one shown in graph (b), is where the rotor speed has started from a value equal to or above the upper threshold of the rotor speed range 401 and has decreased to a value equal to or below the lower threshold of the rotor speed range 401. In this situation, the rotor speed is held at a value equal to or above the upper threshold of the rotor speed range 401 so as to avoid the avoidance zone 400, and then rapidly decreased through the rotor speed range 401 to a value equal to or below the lower threshold of the rotor speed range 401.

In general, the control of the rotor speed may be done in any appropriate way. The adjustment of the rotor speed to a given value may be obtained by adjusting the speed in accordance with a rotor speed setpoint. However, the rotor speed may also be adjusted by other means, such as use of a rotor torque setpoint or output power setpoint. It will be appreciated by those skilled in the art that the invention has been described by way of example only, and that a variety of alternative approaches may be adopted without departing from the scope of the invention, as defined by the appended claims.

The invention claimed is:

1. A method of controlling a wind turbine for avoiding of edgewise vibrations, the method comprising:
    determining a whirling mode frequency of a rotor blade of the wind turbine;
    applying a band-pass filter to a measured signal indicative of a movement of the rotor blade to produce a filtered signal, wherein a centre frequency of the band-pass filter is the whirling mode frequency;

in response to determining that the whirling mode frequency differs from a central frequency of the filtered signal, setting the whirling mode frequency as the central frequency of the filtered signal;

after setting the whirling mode frequency as the central frequency of the filtered signal, determining an avoidance zone based on the whirling mode frequency, the avoidance zone being a rotor speed range; and receiving a rotor speed setpoint, wherein the method further comprises at least one of:
adjusting a rotor speed to a value outside the rotor speed range if the rotor speed setpoint is within the rotor speed range; or
adjusting the rotor speed to a value corresponding to the rotor speed setpoint if the rotor speed setpoint is outside the rotor speed range.

2. The method according to claim 1, wherein controlling and adjusting the rotor speed further comprise performing at least one of a first operation or a second operation, wherein:
the first operation comprises:
maintaining the rotor speed at a value equal to or below a rotor speed corresponding to a lower threshold of the rotor speed range when the received rotor speed setpoint is within the rotor speed range; and
increasing the rotor speed if the rotor speed setpoint equals or exceeds an upper threshold of the rotor speed range; and
the second operation comprises:
maintaining the rotor speed at a value equal to or above a rotor speed corresponding to the upper threshold of the rotor speed range when the rotor speed setpoint is within the rotor speed range; and
decreasing the rotor speed if the rotor speed setpoint equals or falls below the lower threshold of the rotor speed range.

3. The method according to claim 2, wherein increasing the rotor speed if the rotor speed setpoint equals or exceeds the upper threshold of the rotor speed range occurs when the rotor speed setpoint equals or exceeds the upper threshold of the rotor speed range for a predetermined period.

4. The method according to claim 2, wherein the step of decreasing the rotor speed if the rotor speed setpoint equals or falls below the lower threshold of the rotor speed range occurs when the rotor speed setpoint equals or falls below the lower threshold of the rotor speed range for a predetermined period.

5. The method according to claim 2, wherein the rotor speed is increased or decreased non-linearly with respect to wind speed.

6. The method according to claim 1, wherein the determined whirling mode frequency is one or more of a forward whirling mode and a backward whirling mode.

7. The method according to claim 1, wherein the determined whirling mode frequency is determined in dependence on a measured rotor frequency and a predetermined edgewise vibration frequency of the rotor blade.

8. The method according to claim 1, wherein the measured signal is indicative of an edgewise vibration of the rotor blade.

9. The method according to claim 1, wherein a lower threshold and an upper threshold of the avoidance zone are each calculated as a percentage of the determined whirling mode frequency.

10. The method according to claim 1, further comprising increasing or decreasing a width of the avoidance zone.

11. The method according to claim 1, wherein a centre value of the avoidance zone is the determined whirling mode frequency.

12. The method according to claim 1, wherein the rotor speed within the rotor speed range is a non-linear function of wind speed.

13. A controller for a wind turbine control system comprising a processor and a memory module, wherein the memory module comprises a set of program code instructions which when executed by the processor implement an operation of controlling a wind turbine for avoiding edgewise vibrations, comprising:
determining a whirling mode frequency of a rotor blade of the wind turbine;
applying a band-pass filter to a measured signal indicative of a movement of the rotor blade to produce a filtered signal, wherein a centre frequency of the band-pass filter is the whirling mode frequency;
in response to determining that the whirling mode frequency differs from a central frequency of the filtered signal, setting the whirling mode frequency as the central frequency of the filtered signal;
after setting the whirling mode frequency as the central frequency of the filtered signal, determining an avoidance zone based on the whirling mode frequency, the avoidance zone being a rotor speed range; and
receiving a rotor speed setpoint,
wherein the operation further comprises at least one of:
adjusting a rotor speed to a value outside the rotor speed range if the rotor speed setpoint is within the rotor speed range; or
adjusting the rotor speed to a value corresponding to the rotor speed setpoint if the rotor speed setpoint is outside the rotor speed range.

14. A wind turbine, comprising:
a tower;
a nacelle disposed on the tower;
a rotor extending from the nacelle and having a plurality of blades disposed on a distal end; and
a control system configured to perform an operation, comprising:
determining a whirling mode frequency of a rotor blade of the plurality of blades;
applying a band-pass filter to a measured signal indicative of a movement of the blade to produce a filtered signal, wherein a centre frequency of the band-pass filter is the whirling mode frequency;
in response to determining that the whirling mode frequency differs from a central frequency of the filtered signal, setting the whirling mode frequency as the central frequency of the filtered signal;
after setting the whirling mode frequency as the central frequency of the filtered signal, determining an avoidance zone based on the whirling mode frequency, the avoidance zone being a rotor speed range for the rotor; and
receiving a rotor speed setpoint,
wherein the operation further comprises at least one of:
adjusting a rotor speed to a value outside the rotor speed range if the rotor speed setpoint is within the rotor speed range; or
adjusting the rotor speed to a value corresponding to the rotor speed setpoint if the rotor speed setpoint is outside the rotor speed range.

15. A computer program product comprising a non-transitory computer-readable medium storing program code instructions for implementing an operation of controlling a wind turbine for avoiding edgewise vibrations, comprising:
  determining a whirling mode frequency of a rotor blade of the wind turbine;
  applying a band-pass filter to a measured signal indicative of a movement of the rotor blade to produce a filtered signal, wherein a centre frequency of the band-pass filter is the whirling mode frequency;
  in response to determining that the whirling mode frequency differs from a central frequency of the filtered signal, setting the whirling mode frequency as the central frequency of the filtered signal;
  after setting the whirling mode frequency as the central frequency of the filtered signal, determining an avoidance zone based on the whirling mode frequency, the avoidance zone being a rotor speed range; and
  receiving a rotor speed setpoint,
  wherein the operation further comprises at least one of:
    adjusting a rotor speed to a value outside the rotor speed range if the rotor speed setpoint is within the rotor speed range; or
    adjusting the rotor speed to a value corresponding to the rotor speed setpoint if the rotor speed setpoint is outside the rotor speed range.

16. The computer program product according to claim 15, wherein controlling and adjusting the rotor speed further comprise performing at least one of a first operation or a second operation, wherein:
  the first operation comprises:
    maintaining the rotor speed at a value equal to or below a rotor speed corresponding to a lower threshold of the rotor speed range when the received rotor speed setpoint is within the rotor speed range; and
    increasing the rotor speed if the rotor speed setpoint equals or exceeds an upper threshold of the rotor speed range; and
  the second operation comprises:
    maintaining the rotor speed at a value equal to or above a rotor speed corresponding to the upper threshold of the rotor speed range when the rotor speed setpoint is within the rotor speed range; and
    decreasing the rotor speed if the rotor speed setpoint equals or falls below the lower threshold of the rotor speed range.

17. The computer program product according to claim 15, wherein the determined whirling mode frequency is one or more of a forward whirling mode and a backward whirling mode.

* * * * *